(12) United States Patent
Miyajima

(10) Patent No.: US 6,444,157 B1
(45) Date of Patent: *Sep. 3, 2002

(54) METHOD OF RESIN MOLDING

(75) Inventor: Fumio Miyajima, Togura-machi (JP)

(73) Assignee: Apic Yamada Corporation, Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,153

(22) Filed: Jun. 2, 1998

Related U.S. Application Data

(62) Division of application No. 08/562,151, filed on Nov. 22, 1995, now Pat. No. 5,800,841.

(30) Foreign Application Priority Data

Nov. 24, 1994 (JP) ............................................. 6-289428
May 26, 1995 (JP) ............................................. 7-127658

(51) Int. Cl.⁷ ...................... B29C 33/18; B29C 33/68; B29C 45/02; B29C 45/14
(52) U.S. Cl. .................. 264/511; 264/272.17; 264/276; 264/272.15; 264/316; 425/116; 425/544; 425/546; 425/121
(58) Field of Search ..................... 264/272.11, 272.15, 264/272.17, 316, 328.4, 328.5, 276, 511; 425/116, 121, 123, 117, 543, 544, 546

(56) References Cited

U.S. PATENT DOCUMENTS 3,083,408 A    4/1963   Bichl ............................ 425/89
3,216,060 A   11/1965   Trojanowski et al. ......... 425/89
3,410,699 A   11/1968   Peters ........................... 425/89
4,442,056 A    4/1984   Slepcevic .................... 425/121
4,872,825 A   10/1989   Ross ............................ 425/117
4,956,141 A  * 9/1990   Allen et al. .................. 264/316
4,965,037 A  * 10/1990  Weaver et al. .............. 264/511
5,000,903 A  * 3/1991   Matzinger et al. .......... 264/511
5,098,626 A  * 3/1992   Pas .......................... 264/328.5
5,151,276 A  * 9/1992   Sato et al. .................. 425/110
5,529,474 A    6/1996   Goh et al. ................... 425/572
H1654     H   6/1997   Rounds ....................... 425/89
5,674,343 A  * 10/1997  Hotta et al. ............. 264/272.17
5,846,477 A  * 12/1998  Hotta et al. ............. 264/272.17

FOREIGN PATENT DOCUMENTS

DE    1 110855       8/1956    .................. 425/398
EP      561310       9/1993    .................. 425/398
EP    0 665584 A1    8/1995
JP    61167515 A  *  7/1986
JP    1 293523      11/1989    .................. 425/544
JP    1 299008      12/1989    .................. 425/117
JP      437507       2/1992

* cited by examiner

Primary Examiner—Angela Ortiz
(74) Attorney, Agent, or Firm—Birch, Stewart, Kolasch & Birch, LLP

(57) ABSTRACT

A method of resin molding for molding regular products and a resin molding machine for the same. In the method of the present invention, release film, which is capable of easily peeling off from molding dies and resin, is provided on faces of molding dies. A member to be molded by the molding dies 15 is clamped together with the release film. An inner face of a pot of the molding die is covered with the release film. A resin tablet is supplied into the pot.

11 Claims, 8 Drawing Sheets

METHOD OF RESIN MOLDING

This application is a division of U.S. application Ser. No. 08/562,151, filed Nov. 22, 1995, now U.S. Pat. No. 5,800,841.

BACKGROUND OF THE INVENTION

1. Field of the Invention

The present invention relates to a method of resin molding and a resin molding machine. More precisely, the present invention relates to a method of resin molding comprising the steps of: providing release film, which is capable of easily peeling off from molding dies and resin, on a parting faces of the molding dies; and clamping a member to be molded by the molding dies together with the release film, and a resin molding machine for executing said method.

2. Description of Background Art

A conventional resin molding machine is shown in FIG. 16. In the conventional machine, a member to be molded is clamped between an upper die 10a and a lower die 10b. Resin heated and melted in a pot 12 is pressurized and sent to a cavity 14 by a plunger 13. Resin tablets, which are formed by: kneading resin materials; forming the resin kneaded into granules and compressing the granular resin to form into the tablet shapes, are used as resin for molding.

The resin sent from the pot 12 directly contacts molding faces of the molding dies, so the molding dies are made of abrasion-proof metal with enough durability. The conventional molding dies have ejector pins 16, which eject a molded product from the molding dies.

Thermosetting resin, e.g., epoxy resin, phenolic resin, are usually used for the resin molding. Generally, the resin is required to be easily peeled off from the molding dies and to tightly adhere to the member to be molded, e.g., a lead frame. However, said required conditions of the resin are mutually contradictory, so that the resin which properly satisfies required conditions is selected. Actually, characteristics of the resin must be one-sided. For example, when one resin, which is capable of very easily peeling off from the molding dies, is used for the molding, the solidified resin is apt to peel off from the member to be molded.

On the other hand, when another resin, which has greater adhering force, is used, the solidified resin is not capable of easily peeling off from the molding dies. And some ejector pins cannot be moved, so that the molded product cannot be ejected from the molding dies. Further, when gates are broken after molding, solidified resin, which is solidified in the gates or runners, is left on a surface of the molded product, e.g., a lead frame.

SUMMARY OF THE INVENTION

An object of the present invention is to provide a method of resin molding for molding said regular products and a resin molding machine for the same. Compared with the conventional molding method and the molding machine, the present invention is capable of making molding quality higher and decreasing manufacturing cost of the products.

To achieve the object, the method of the present invention comprising the steps of:
 covering at least an inner face of a pot of molding dies with release film, which is capable of easily peeling off from the molding die and resin;
 supplying a resin tablet into the pot; and
 clamping a member to be molded between the molding dies to mold.

In this method, the molding can be executed without using the wrapped resin.

In the method, the covering step may comprise the steps of:
 covering over the face including a cavity, a cull and a pot with a sheet of the release film; and
 sucking the release film to fix onto a part of the face for clamping the member to be molded, an inner face of the cavity, an inner face of the cull and the inner face of the pot.

And in the method, the covering step may comprise the steps of:
 covering over the face including a cavity, a cull and a pot with a sheet of the release film; and
 sucking the release film to fix onto the face for clamping the member to be molded, an inner face of the cavity and an inner face of the cull;
 providing the resin tablet onto the release film at a position corresponding to the pot; and
 setting the resin tablet in the pot by closing the molding dies.

In the method, the release film may have an accommodating section into which the resin tablet is supplied, and the accommodating section may be formed to correspond to an inner shape of the pot. In this case, unwillful shift of the release film on the molding dies can be prevented.

In the method, the accommodating section may be formed in the release film before providing the release film on the face of the molding die.

If the resin tablet is preheated in the accommodating section, and the resin tablet is supplied together With the release film, the molding quality can be improved.

Further, in the method, a resin path, which passes over an opening section of the pot and the member to be molded, may be covered with additional release film. In this case, the molding can be executed without adhering surplus resin to the product.

On the other hand, the molding machine of the present invention comprises:
 molding dies capable of clamping a member to be molded;
 a pot for sending resin melt to cavities of the molding dies with pressure; and
 a fixing mechanism for fixing a sheet of the release film on the face including a cavity, a cull and the pot,
 wherein release film, which is capable of easily peeling off from molding dies and resin, is provided on faces, which include the cavities, of the molding dies.

In the machine, the pot may be capable of accommodating the stick-type resin tablet. And the molding die may have a plurality of pots, which are capable of accommodating the columnar resin tablets.

Furthermore, the machine of the present invention comprises:
 molding dies;
 a pot being formed in the molding die; and
 a film forming mechanism being provided on the film-supplying side of the molding dies, the film forming mechanism being capable of forming an accommodating section, into which the resin tablet is supplied, in the release film,
 wherein an inner face of the pot is covered with release film when molding is executed. With this machine, the release film having the accommodating sections can be supplied to the molding dies, so that continuous molding can be executed.

The machine may further comprise a preheating mechanism for preheating the resin tablet which is accommodated in the accommodating section.

Further, the machine may further comprise an additional film forming mechanism for forming an additional release film, which is capable of covering over a resin path, which passes over an opening section of the pot and a member to be molded.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described with reference to the accompanying drawings.

First Embodiment

Figure 1:
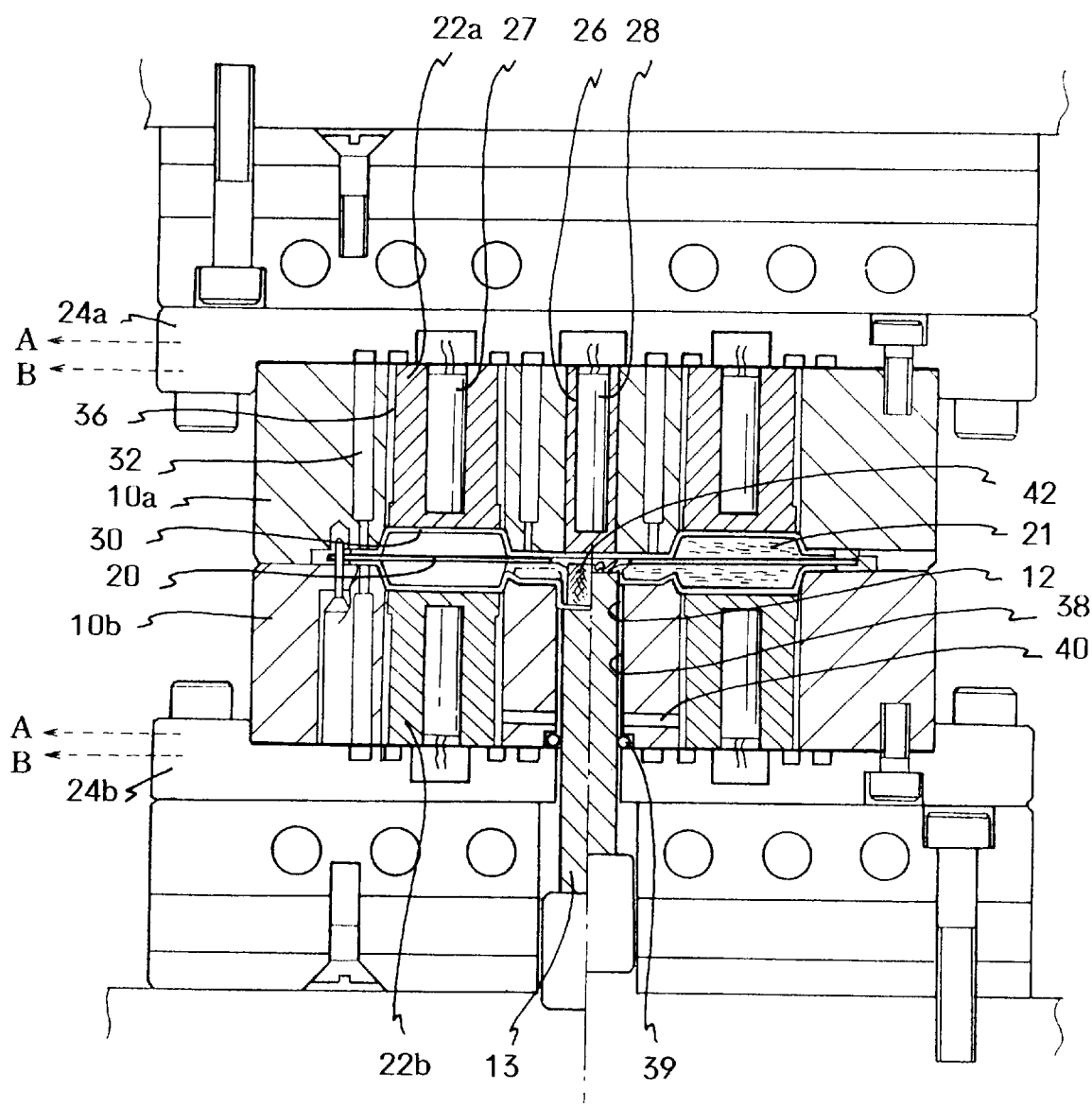
FIG. 1 is a sectional view of a molding machine of according to a first embodiment.

FIG. 1 is a sectional view of a resin molding machine of the present embodiment, e.g., a machine for molding semiconductor devices. In FIG. 1, the left side of the center line shows a state of clamping a lead frame, which is an example of a member to be molded; the right side of the center line shows a state of filling resin in a cavity 21.

There are formed cavities in an upper die 10a and a lower die 10b. In the present embodiment, the dies 10a and 10b are made of steel. But cavity pieces 22a and 22b, which form cavities in the dies 10a and 10b, are made of another, metallic material having a higher heat conductivity, e.g., copper, aluminum. By employing the material having a higher heat conductivity, solidification of the resin can be accelerated. Note that, the cavity pieces 22a and 22b may be made of steel, too.

Figure 2:
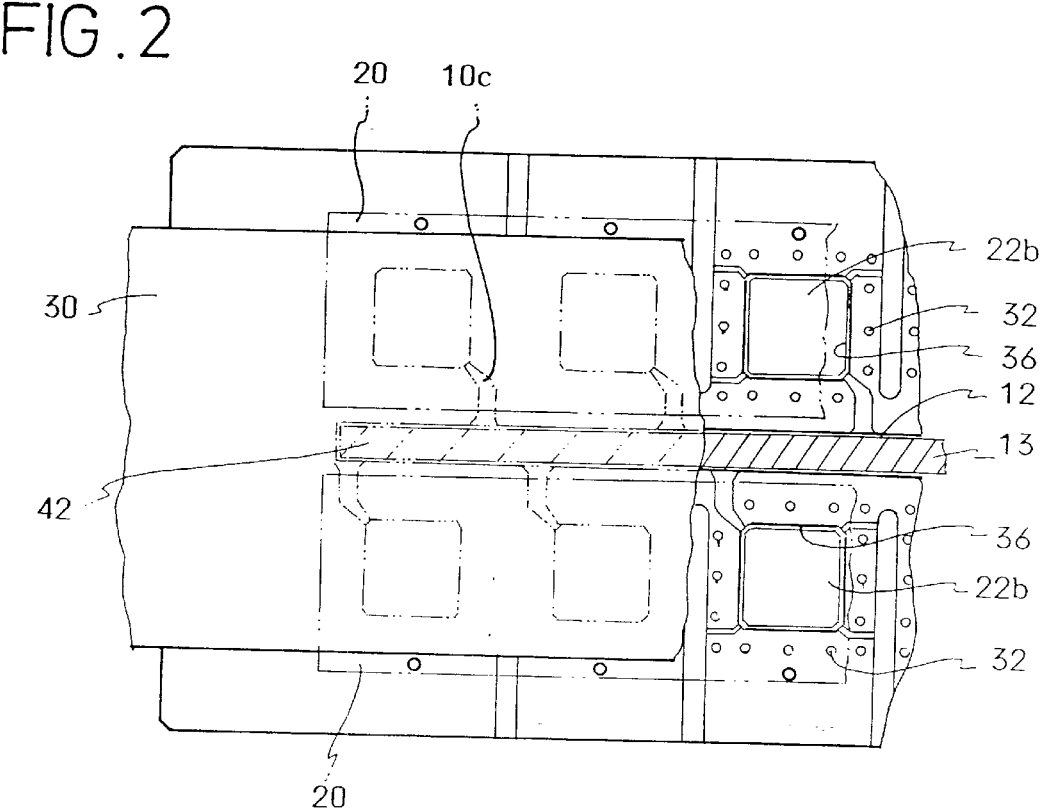
FIG. 2 is a view showing release film on a lower die.

FIG. 2 shows a planar provision of the cavity pieces 22b on the lower die 10b. In the present embodiment, to lead frames 20 is respectively set on the both sides of a pot 12 and molded.

The cavity pieces 22a and 22b are formed into blocks. The cavity pieces 22a and 22b are inserted in through-holes, which are bored in base sections of the dies 10a and 10b, and fixed to plates 24a and 24b.

Besides the cavity pieces 22a and 22b, a cull piece 26 is inserted in holes, which are bored in the base sections of the upper die 10a. The cull piece 26 is arranged to face the pot 12. The cull piece 26 is also fixed to the plate 24a. The cull piece 26 also may be made of the metallic material heaving a higher heat conductivity, e.g., copper, aluminum.

As described above, since the cavity pieces 22a and 22b and the cull piece 26 are made of the metalic material having a higher heat conductivity, heat exchange between the resin and the dies is accelerated, so that the resin can be solidified in a short time. By solidifying the resin in a short time, cycle time of the molding work can be shortened. In the present embodiment, heaters 27 and 28 with thermocouples are provided in the cavity pieces 22a and 22b and the cull piece 26 so as to effectively control temperature.

In the present embodiment, faces of the molding dies 10a and 10b are covered with release film. By employing the release film, the metalic materials having higher heat conductivity, e.g., copper, aluminum, which are not used for ordinary molding dies, can be used in the molding dies.

Faces of the molding dies 10a and 10b, which contact the resin, are previously covered with the release film. The release film preferably has: heat resistibility over the molding temperature of the dies 10a and 10b; peel-ability with respect to the dies 10a and 10b and the resin; and high extensibility. For example, FEP sheet film, PET sheet. film, PTFE sheet film, glass cloth in which flouric resin is impregnated, polyvinylidene chloride, etc. can be employed as the release film.

The present embodiment is characterized in that resin molding sections, e.g., the cavities, the pot 12 and cull of the dies are covered with a sheet of the release film 30.

In the resin molding method using the release film 30, the release film 30 is fed onto parting faces of the molding dies 10a and 10b, which have been opened, so as to cover the parting faces. Then the resin and members to be molded are set in the molding die 10b. The members to be molded are clamped by the molding dies 10 and 10b and molded by filling the resin in the cavities.

In the present embodiment, the parting faces of the molding dies are covered with the release film 30, so sucking holes 32, which open in parts of the parting faces: clamping faces, for sucking the release film 30 are formed. Arid cavity sucking holes 36, which are gaps between outer side faces of the cavity pieces 22a and 22b and inner faces of the through-holes of the molding dies 10a and 10b in which the cavity pieces 22a and 22b are inserted, are formed to suck and fix the release film 30 along inner shapes of the cavities.

As shown in FIG. 2, The sucking holes 32 are opened in the clamping face and arranged around the cavity. The sucking holes 32 are communicated with air paths in the plates 24a and 24b, which are connected to an external air sucking mechanism A. The cavity sucking holes 36 are opened like slits and respectively enclose a bottom face of each cavity. The cavity sucking holes 36 are communicated with air paths in the plates 24*a* and 24*b*, which are connected to an external air sucking mechanism B. The width of the release film 30 is designed to cover over the cavities, which are provided on both sides of the pot 12, in the molding dies 10*a* and 10*b* (see FIG. 1). When the release film 30 is sucked to fix onto the parting faces of the molding dies 10*a* and 10*b*, firstly the release film 30, which has been fed on the parting faces, is sucked by the sucking holes to fix on the clamping faces, then parts of the release film 30, which cover the cavities, are sucked by the cavity sucking holes 36 to fix the parts of the release film 30 in the cavities along inner faces thereof. By this sucking process, the cavities, which are covered with the release film 30, can be formed.

A part of the release film 30, which covers the pot 12, is sucked by an air path 38, which is a gap between inner faces of the pot 12 and outer side faces of the plunger 13. In the present embodiment, to form the air path 38, a seal ring 39 is attached on the outer faces of the plunger 13 close to a base section of the plunger 13 so as to seal the air path 38, and air paths 40, which connect the air path 38 with the cavity sucking holes 36 formed in the lower die 10*b*. The release film 30 and the resin melt are pushed up by the plunger 13 while molding, so that size of the air path 38 must be designed not to invade the release film 30 in the air path 38 too much.

With this structure, when the release film 30 is sucked by the cavity sucking holes 36, the release film 30 is simultaneously sucked toward the pot 12, so that the release film 30 can be fixed along the inner faces of the pot 12 and an upper end face of the plunger 13. In the state of opening the dies 10*a* and 10*b*, the upper end face of the plunger 13 is located under an opening section of the pot 12 so as to supply the resin tablet into the pot 12, so that a concave section of the release film 30 is formed in the pot 12 by the air suction. In FIG. 1, the left side of the center line shows the state of fixing the release film 30 in the cavities and the pot 12; the right side of the center line shows the state of supplying the resin tablet 42 in the pot 12.

The resin tablet used in the present, embodiment is generally used in the conventional molding machines, too. The resin tablet is formed by forming crashed tablet into a columnar shape by a compressing machine or by forming a sheet of resin material, which has been extended by an extruding machine, into a tablet shape.

In the present embodiment, the pot 12 is a thin and long type pot as shown in FIG. 2 (a plan view), so the resin tablet 42 is formed into a stick shape corresponding to an inner shape of the pot 12. Resin paths and gates 10*c*, which communicate with the cavities, are branched off from the pot 12. After clamping the lead frames 20, the resin melt is sent by the plunger 13 to mold them.

As shown it the right side of FIG. 1, the plunger 13 pushes the resin, which has been melt in the pot 12, together with the release film 30, so that the resin is filled into the cavities via the resin paths and the gates 10*c*. After completing the mold, molded products are taken out from the molding dies together with the release film 30. Since the release film 30 is capable of easily peeling off from the molding dies, the molded products can be easily ejected from the dies without using ejector pins, which must be provided in the conventional molding machines. And the release film 30 is capable of easily peeling off from the molded products, so the film 30 can be easily ejected from the products. After removing the release film 30, gates of the molded products are removed. Note that, the molded products and the release film 30 may be assisted to eject from the dies by blowing air, which is sent from the air sucking mechanisms A and B, from the sucking holes 32 and 36.

Figure 3:
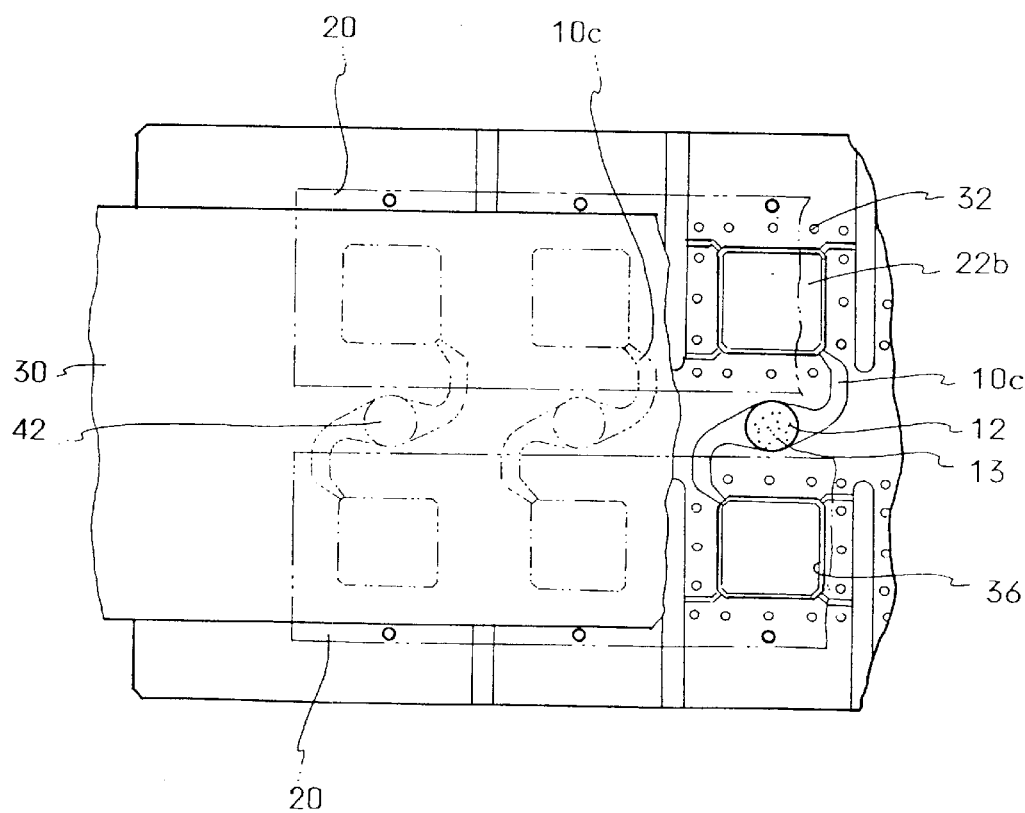
FIG. 3 is a view showing a multi-pot type machine.

A resin molding machine having a plurality of pots: a multi-pot type machine is shown in FIG. 3. FIG. 3 is a plan view of the lower die 10*b*. In this example, the resin paths and the gates 10*c* are extend from each pot 12 to the cavities, which are arranged on both sides of a line of pots 12. Columnar resin tablets are supplied into each pot 12.

The release film 30 is sucked to fixed on the dies in the manner in the above described example. Namely, the release film 30 is sucked to fixed on the clamping faces by the sucking holes 32, then the part of the release film corresponding to the cavities and the pots 12 are sucked to be fixed in the cavities and the pots along the inner faces thereof. After covering the dies with the release film 30, the columnar resin tablets are supplied into the pots 12 to be molded.

In the present embodiment, by covering the parting faces of the molding dies 10*a* and 10*b* with the release film 30, the molding can be executed without the resin contacting the molding dies. However, the resin sticks onto the lead frames 20 at positions corresponding to the resin paths and the gates 10*c*, which connect the pot 12 to the cavities 21. To prevent the resin from sticking on the lead frames 20, additional release film 31 is provided between the lead frames 20 and the lower die 10*b* at the positions corresponding to the resin paths and the pot 12 (see FIG. 4).

The additional release film 31 is set on the lower die 10*b* to cover the pot 12, the resin paths and the gates 10*c*, after fixing the release film 30 on the lower die 10*b* and supplying the resin tablets 42 in the pot 12.

Figure 4:
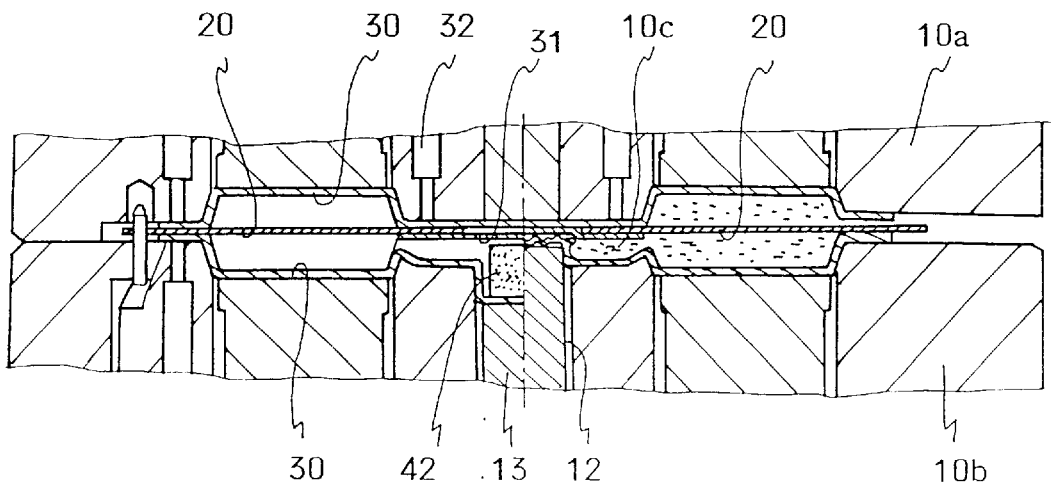
FIG. 4 is a sectional view of a machine using the release film and an additional release film.

After setting the additional release film 31, the lead frames 20 (the members to be molded) are set and clamped by the molding dies 10*a* and 10*b* in which the release film 30 is fixed. Then molding is executed. In FIG. 4, the right side of the center line shows the state of filling a resin in the cavities 21, no resin is stuck on the lead frame 20 at the position corresponding to the resin path, by providing the additional release film 31 between the lead frame 20 and the release film 30.

Figure 5:
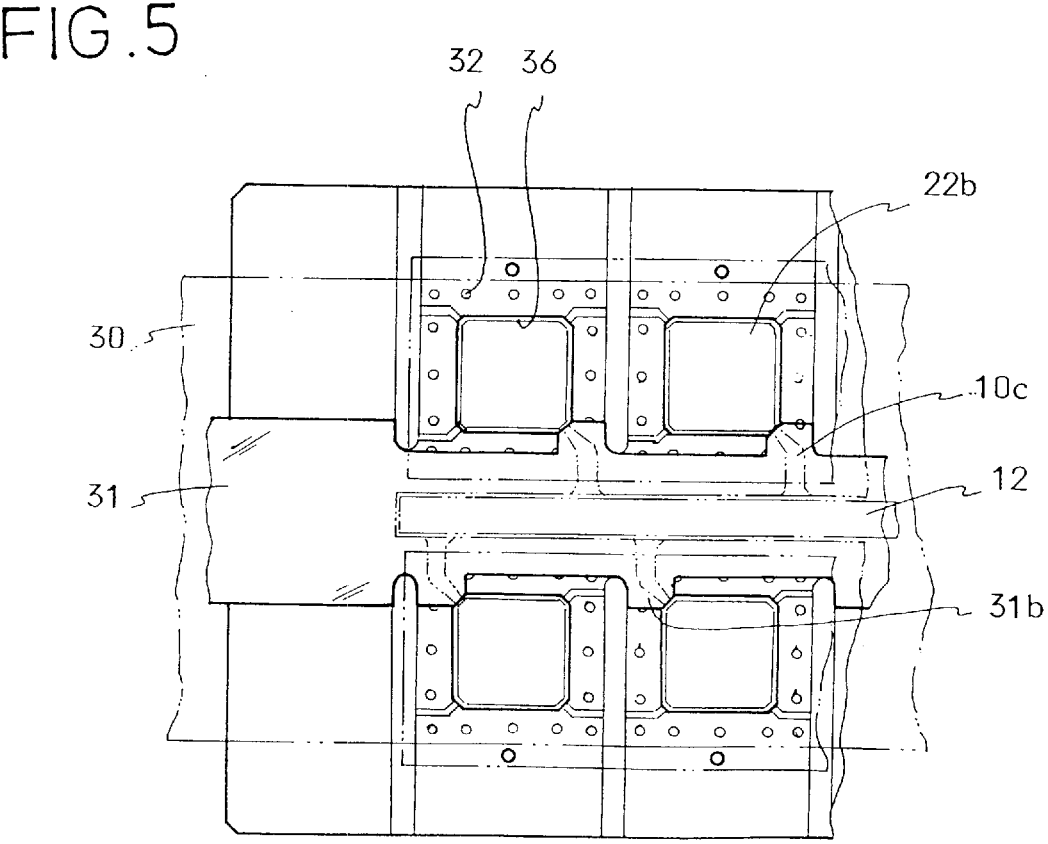
FIG. 5 is a plan view showing the provision of the release film and the additional release film.

A planar arrangement of the release film 30 and the additional release film 31 on the lower die 10*b* is shown in FIG. 5. The additional release film 31 is required to cover an upper part of the pot 12, and the resin paths and the gates 10*c* connecting the pot 12 to the cavities. In the present embodiment, the additional release film 31 has extended sections 31*b*, which extend from the side edges of the additional release film 31 to cover connecting sections of the gates 10*c* and cavity corners. The extended sections 31*b* are extended according to the planar arrangement of the pot 12, the resin paths and the gates 10*c*. To prevent the resin from sticking on the lead frames 20, the additional release film 31 must be located to correspond to the cavities, the gates 10*c*, etc.

In the case of using the additional release film 31, total film thickness must be thicker, so there must be formed step sections for fitting the thicker film sections in the molding dies.

Note that, the additional release film 31 is used to prevent the resin from sticking on the lead frames 12, thus the additional release film 31 may be formed into various shapes other than the shape having the extended sections 31*b*.

Figure 6:
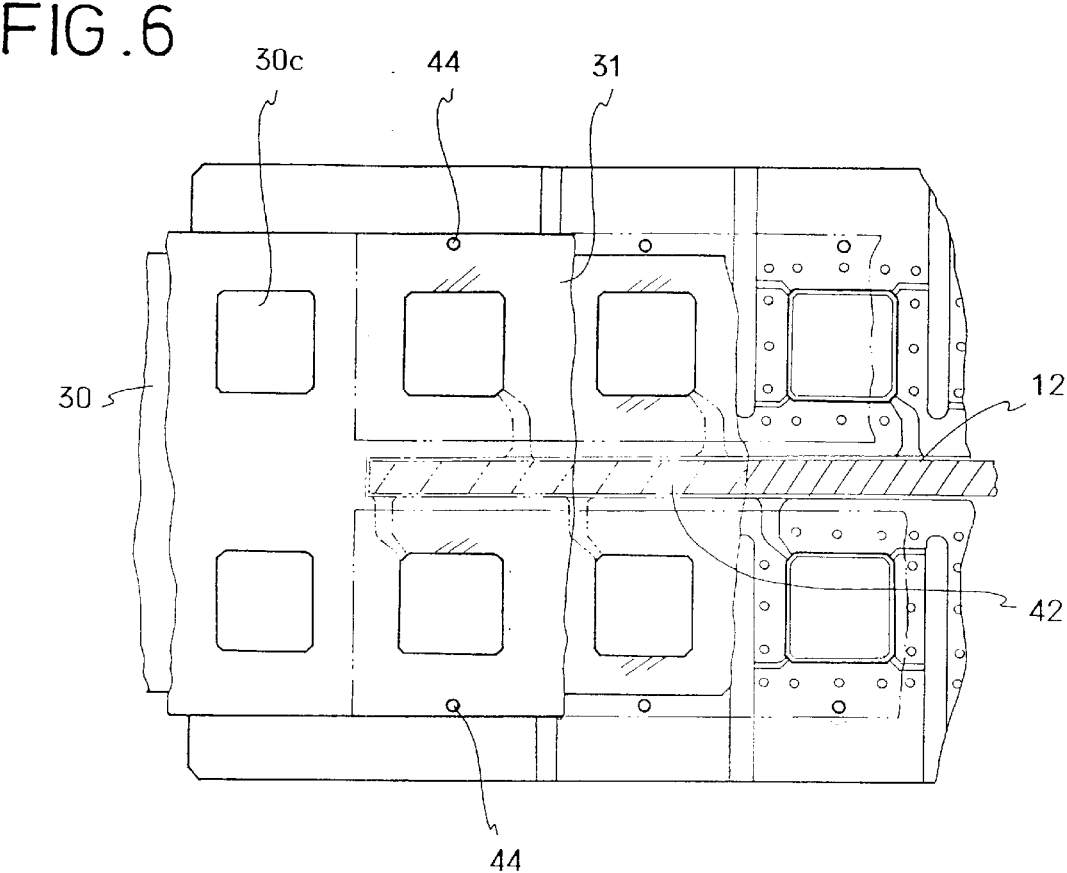
FIG. 6 is a plan view showing the provision of the release film and the additional release film.

Another example with the additional release film 31 is shown in FIG. 6., a whole side of the lead frame 20 except positions corresponding to the cavities is covered with the additional release film 31. Since the cavities of the molding die are covered with the release film 30, the additional release film 31 has holes 30c, which are arranged to correspond to the cavities and whose size is equal to opening sections of the cavities.

In this case, firstly the release film 30 is fixed on the molding die 10b, the resin tablet 42 is supplied into the pot 12, then the additional release film 31 is set on the lower die 10b. The additional release film 31 is wider than the release film 30 so as to cover the whole lead frames 20. To position the additional release film 31 on the lower die 10b, there are provided guide pins 44 for positioning the lead frames 20 on the lower die 10b. FIG. 6 shows the state of positioning the additional release film 31 on the lower die 10b by the guide pins 44 after the release film 30 is sucked and fixed. By boring positioning holes in the additional release film 31, the additional release film 31 can be precisely set on the lower die 10b. The release film 30 is, of course, designed not to cover the guide pins 44.

In the case of using the wide additional release film 31, the lead frames 20 are wholly covered with the release film 30 and the additional release film 31, so that the film thickness corresponding to the clamping faces will be equal. Thus, no step sections for fitting the thicker film sections is required in the molding dies.

In the case of using the additional release film 31 as shown in FIGS. 5 and 6, two or more sheets of the release film 30 may be employed. Two sheets of the release film 30, for example, may be respectively provided for each lead frames 20, which are set in parallel.

Instead of feeding the additional release film 31 into the dies, the additional release film 31 may be previously adhered on the lead frame 20. In this case, the additional release film 31 is adhered on the lead frame 20 prior to setting the lead frame 20 in the dies. Namely, the lead frame 20 on which the additional release film 31 has been adhered is set in the dies.

The resin tablet 42 is supplied into a concave section of the release film 30, which is formed by sucking the release film 30 towards the inside of the pot 12. But the resin tablet may be set in the pot 12 with the steps of: sucking the release film 30 to fix on the die by the sucking holes 32 without slicking towards the inside of the pot 12; mounting the resin tablet 42 at a position on the release film 30 corresponding to the pot 12; and lightly closing the dies 10a and 10b once.

After once setting the resin tablet 42 in the pot 12, the molding dies 10a and 10b are opened. Then the release film 30 is sucked to fix in the cavities by the cavity sucking holes 36, and the lead frames 20 are set in the dies to mold. Sucking the release film 30 to fix in the cavities may be executed then the release film 30 is fixed on the clamping faces prior to setting the resin tablet.

In the method of setting the resin tablet by once closing the dies 10a and 10b lightly, the release film 30 does not need to be sucked at the pot 12, structures of the molding dies can be simpler.

Note that, the above described example shows the machine, which is capable of molding two lead frames in one molding cycle, but the method can be applied to the molding machine, which molds one lead frame in one molding cycle.

In the above described examples, the release film 30 is a sheet of film having parts made of the same material. The release film whose specific parts corresponding to the pot and the cavities are made of other film materials, may be employed. In the specific parts, film thickness, etc. may be changed with respect to other parts. In this case, another film may be adhered on the specific parts of a sheet of base film, and another separate film may be provided to the specific parts.

The resin molding machine of the present embodiment has the following advantages:

Since no resin contacts the parting faces of the molding dies, the resin, which is capable of well adhering to the members to be molded, can be used for molding, so that reliability of the molded products can be raised;

Various conventional kinds of resin tablets, which have been used in the conventional machines, can be used for the machine;

By exchanging the molding dies and adding the fixing mechanism capable of setting the release film in the dies, the resin molding method using the release film can be executed in the conventional molding machines;

Since the pot, the cull, runners, the gates and the cavities are wholly covered with the release film, cavity blocks, a center block and the pot, which are separated in the conventional machines, can be formed in one block;

The molding dies need not be made of hard materials, so they can be made easily; and With no ejector pins, heaters with thermosensors can be assembled in the molding dies, so that heat control of the molding dies can be precisely executed.

The molding machine of first embodiment employs the a sheet of release film covering over the cavities and the pot as well as the First embodiment. In the present embodiment, the release film is made of a film material, which previously has a concave section in which the resin tablet can be set.

Figure 7:
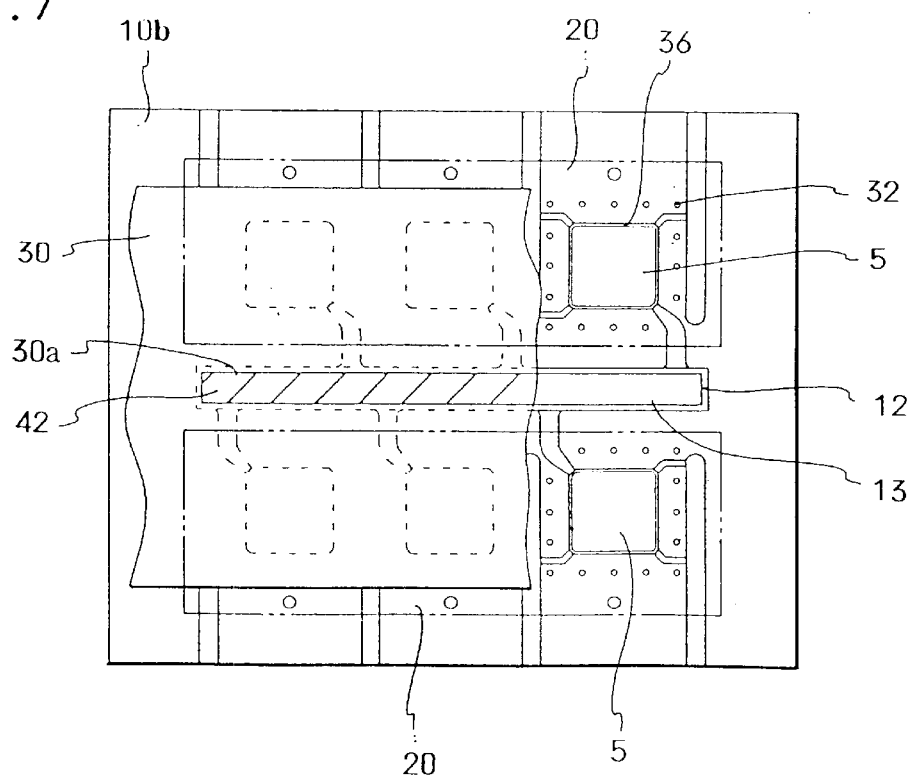
FIG. 7 is a plan view of the lower die according to a second embodiment.

FIG. 7 is a plan view of the lower die 10b on which the release film 30 and the resin tablet 42 are set. The cavity sucking holes 36 are opened in each cavity 5. The sucking holes 32 are opened in the clamping faces of the die 10b.

The release film 30 has a width capable of covering the cavities 5 on both sides of the pot 12.

Figure 8:
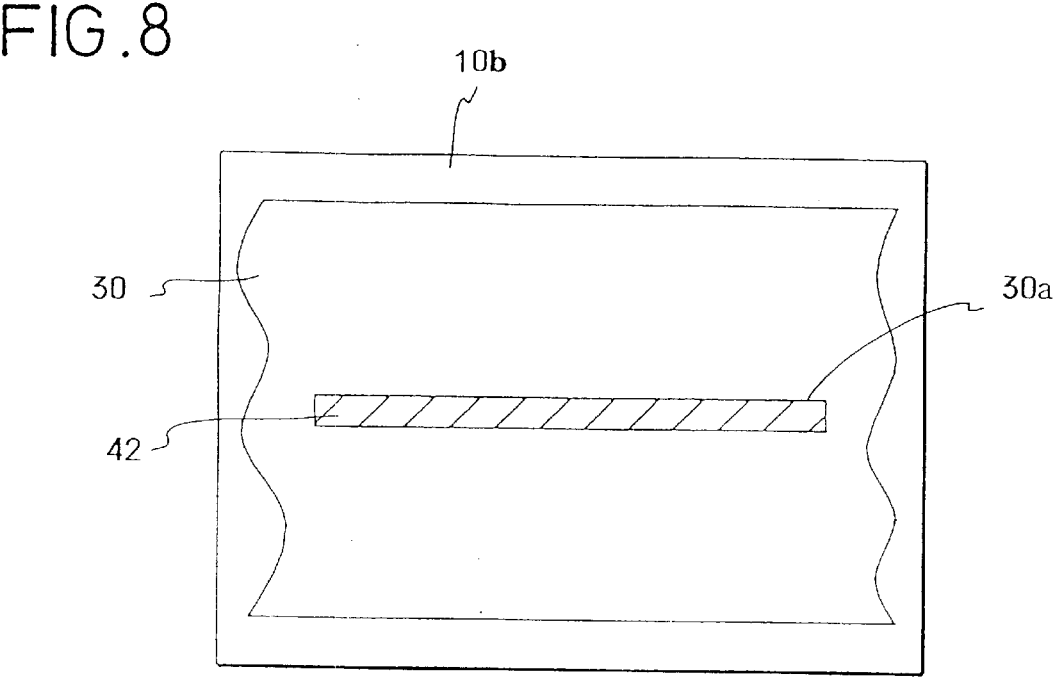
FIG. 8 is a plan view of the lower die on which a resin tablet is set.

FIG. 8 is a plan view of the lower die 10b on which the release film 30 and the resin tablet 42 are set. The pot 12 is a thin and long type pot, so the resin tablet 42 is formed into a stick shape, which can be set in the long pot 12.

Figure 9:
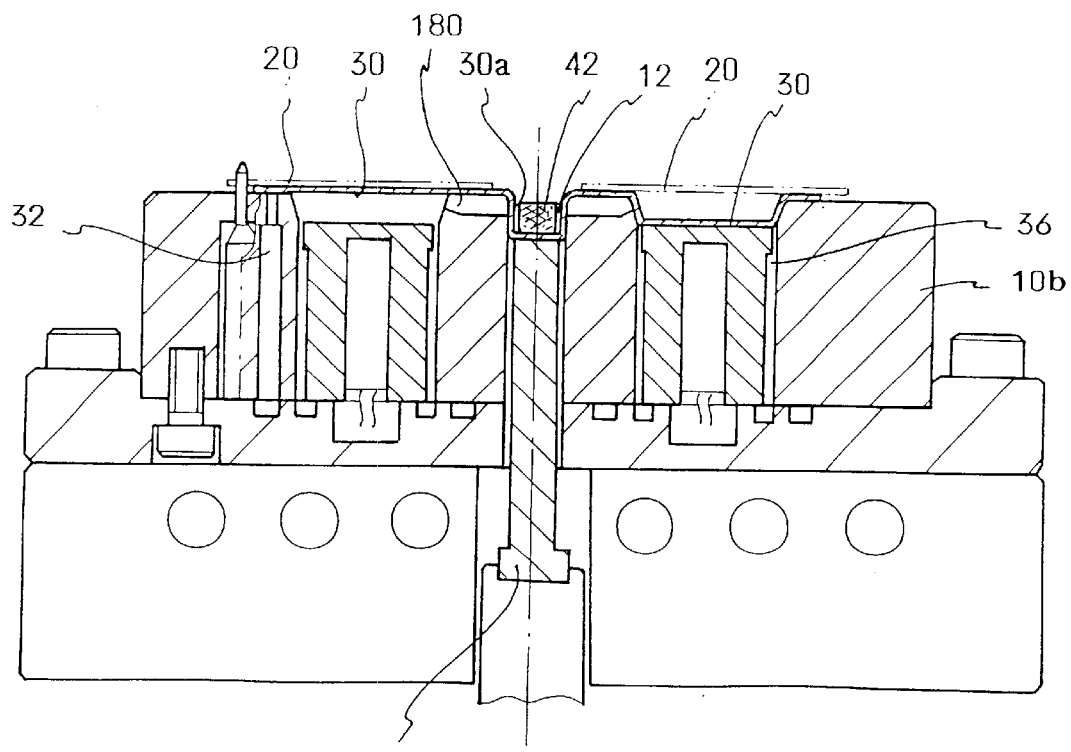
FIG. 9 is a plan view of the lower die on which a resin tablet is set.

FIG. 9 is a sectional view of the lower die 10b on which the release film 30 and the resin tablet 42 are set. The left side of the center line shows the state of setting the release film 30 on the die; the right side of the center line shows the state of sucking the release film 30 to be fixed on the bottom face of the cavity 5. The concave section 30a, which has previously formed in the release film 30, is fitted in the pot 12, and the resin tablet 42 is set in the concave section 30a.

In the present embodiment, since the concave section 30a for accommodating the resin tablet 42 is previously formed in the release film 30, the step of lightly closing the dies to set the resin tablet in the pot can be omitted. By omitting the film suction in the pot 12, a shift of the release film 30 can be prevented.

A film forming unit, which forms the concave section 30a in the release film 30, is preferably provided prior to the step of feeding the release film 30 to the molding dies. The film material is pulled out from a film roll, then the concave section 30a is formed in the film forming unit before feeding to the molding dies. The release film 30 is fed to the molding dies by a conveying unit, whose feeding action is synchronized with a series of molding steps.

Figure 12:
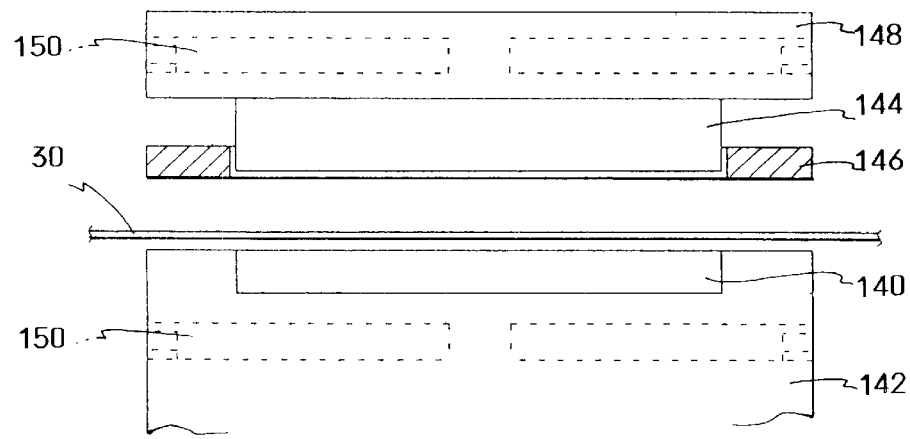
FIG. 12 is a side sectional view of a film forming mechanism.
Figure 13:
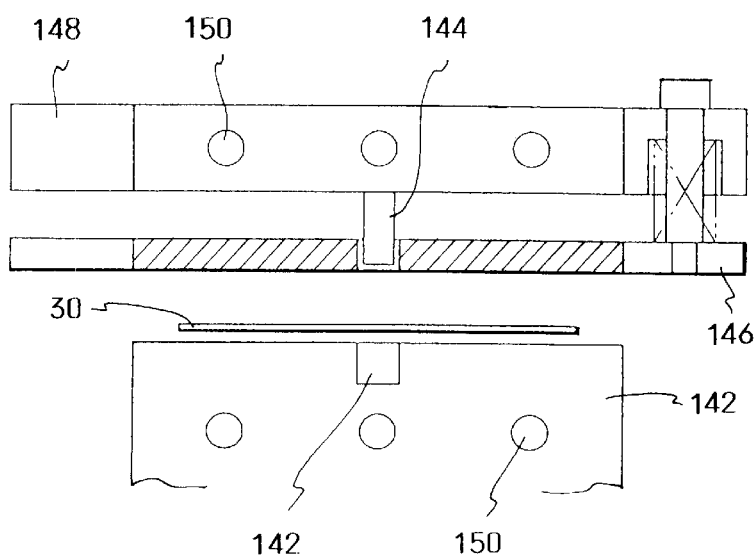
FIG. 13 is a front sectional view of the film forming mechanism.

The film forming unit for forming the concave section 30a in the release film 30 is shown in FIGS. 12 and 13. FIG. 12 is a side view; FIG. 13 is a front sectional view. The film forming unit has: a die 142 having a die-hole whose shape is equal to the shape of the pot 12; a punch 144, which forms the concave section 30a with the die 142; a punch guide 146; and a punch plate 148. The die 142 and the punch 144 are ,heated by heaters 150. While the release film 30 is caught by the punch guide 146 and the die 142, the punch 144 and tire die 142 press the release film 30 to form the concave section 30a in which the resin tablet is set.

The resin tablet 42 may be supplied with the steps of: forming the concave section 30a by the film forming unit; feeding the release film 30 to the molding dies; and supplying the resin tablet 42 into the concave section 30a of the release film 30, or may be supplied with the steps of: forming the concave section 30a by the film forming unit; supplying the resin tablet 42 into the concave section 30a, which is still in the die hole 142 of the film forming unit; pre-heating the resin tablet in the die hole 142; and feeding the resin tablet in the die together with the release film 30.

In the molding machine shown in FIG. 9, the resin paths 180 are formed in the lower die 10b. In the molding machine shown in FIG. 10, the resin paths 180 are formed in the upper die 10a. Thus, the resin paths 180, which are the runners, the gates, etc. connecting the pot 12 with the cavities, may be provided not only in the lower die 10b but also in the upper die 10a.

Figure 10:
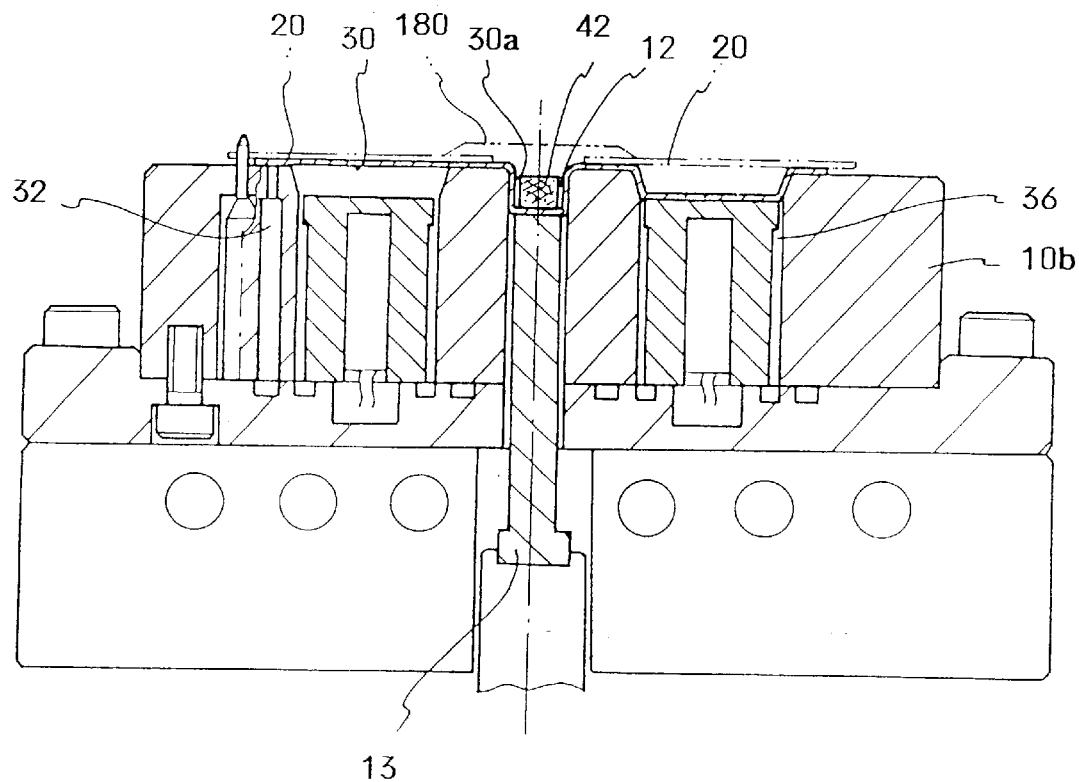
FIG. 10 is a sectional view of a machine having a resin path in the upper die.
Figure 11:
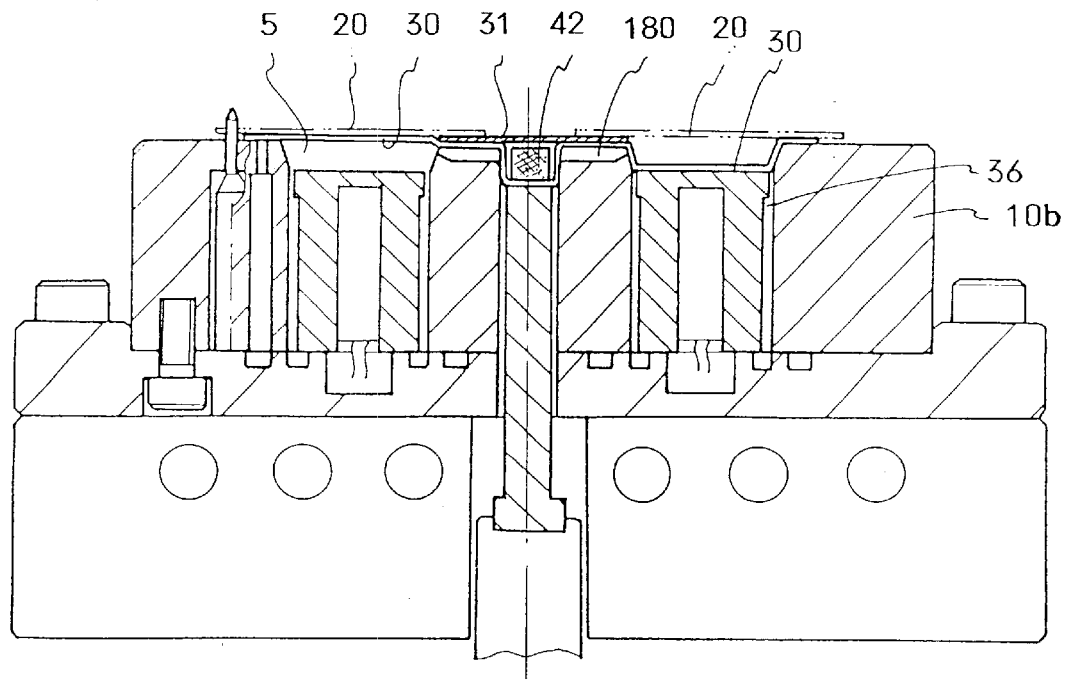
FIG. 11 is a sectional view of a machine using the additional release film.

In the state shown in FIGS. 9 and 10, the resin will stick on the lead frames 20 at the positions corresponding to the resin paths 180, which connect the pot 12 with the cavities. Thus, in this case too, the additional release film 31 can be provided between the release film 30 and the lead frames 20 as well as in the first embodiment. By using the additional release film 31, the resin molding can be executed without sticking the resin onto the lead frames 20. The method using the additional release film 31 is shown in FIG. 11.

The film material having the extended sections 31b, which have been previously formed, may be fed as the additional release film 31. The extended sections 31b may be formed by laser cutting or press cutting before the molding. In the case of supplying the additional release film 31, which has been formed into a desired shape, e.g., forming the extended sections 31b, the additional release film 31 is selected on the basis of products.

The formed additional release film 31 may be adhered to the release film 30, in which the resin tablet 42 has been already supplied in the concave section 30a, to tightly wrap the resin tablet 42. In this case, the release film 30 in which the resin tablet 42 is tightly wrapped will be fed to the molding dies, and the tightly wrapped resin tablet 42 will be set at a prescribed position.

A Third Embodiment

Figure 14:
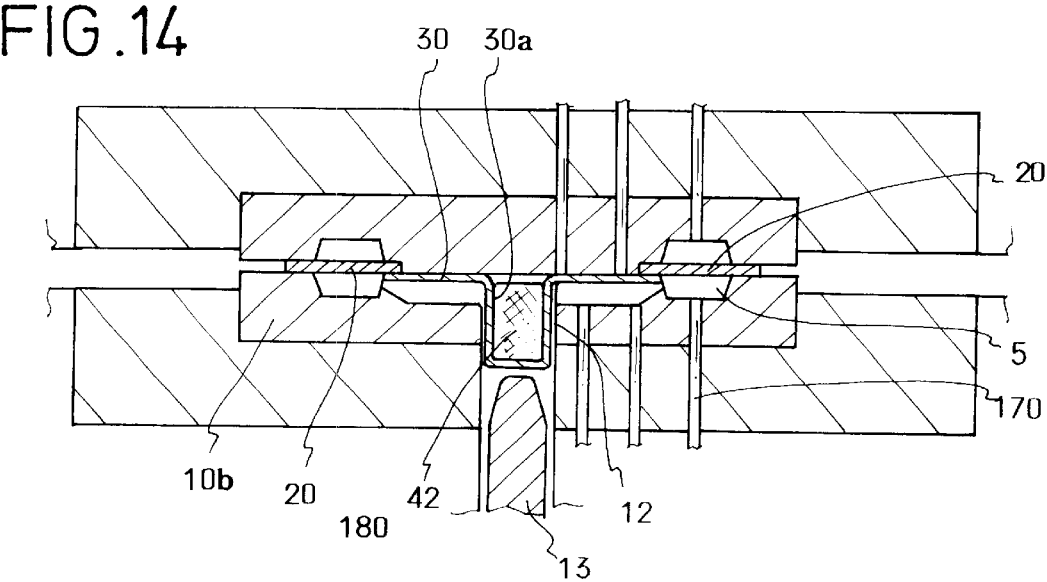
FIG. 14 is a sectional view of a machine according to a third embodiment.

The molding machine of Third Embodiment is shown in FIG. 14. in the machine, the molding sections, e.g., the cavities, are not covered with the release film 30. The release film 30 is provided to cover the pot 12 and the resin paths 180, which connect the pot 12 to the lead frames 20.

The release film 30 has a concave section 30a into which the resin tablet 42 is supplied as well as in the Second embodiment.

In the present embodiment, since the inner faces of the cavities are not covered with the release film 30, the resin directly contacts the molding dies, so that the molded products are ejected from the dies by ejector pins 170, which are provided in the dies.

This method can be applied to conventional molding machines, which are designed to not use a release film. By setting the release film 30 to cover the pot 12 and the resin paths 180, no resin is stuck onto the inner face of the pot 12, so that the resin solidified in the pot 12 and the resin paths 180 can be easily discharged.

Figure 15:
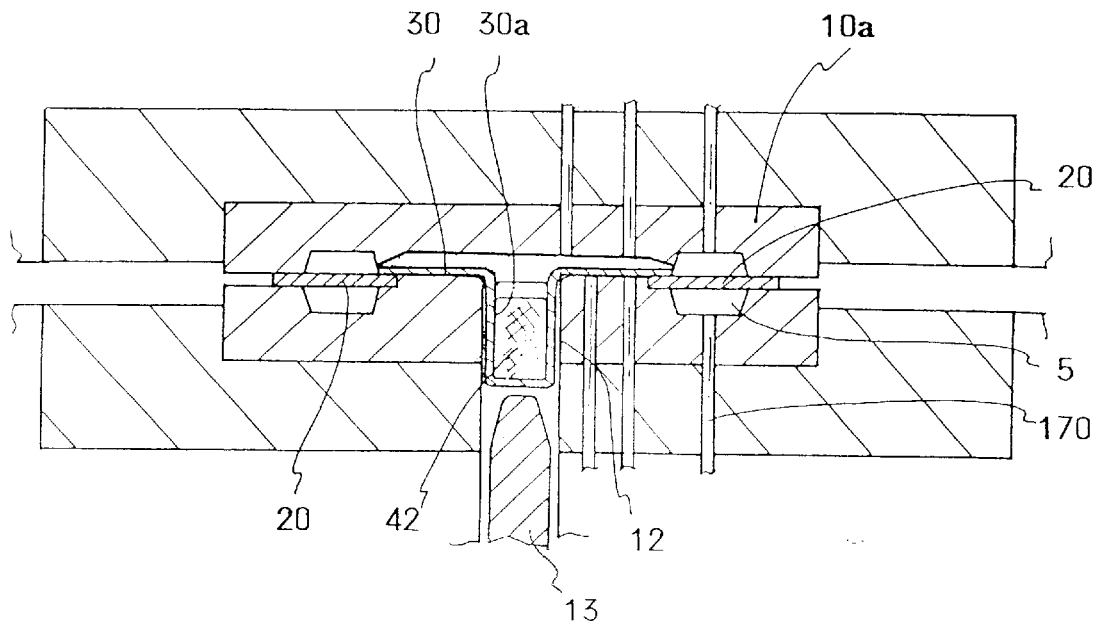
FIG. 15 is a sectional view of a machine having the resin path in the upper die.
Figure 16:
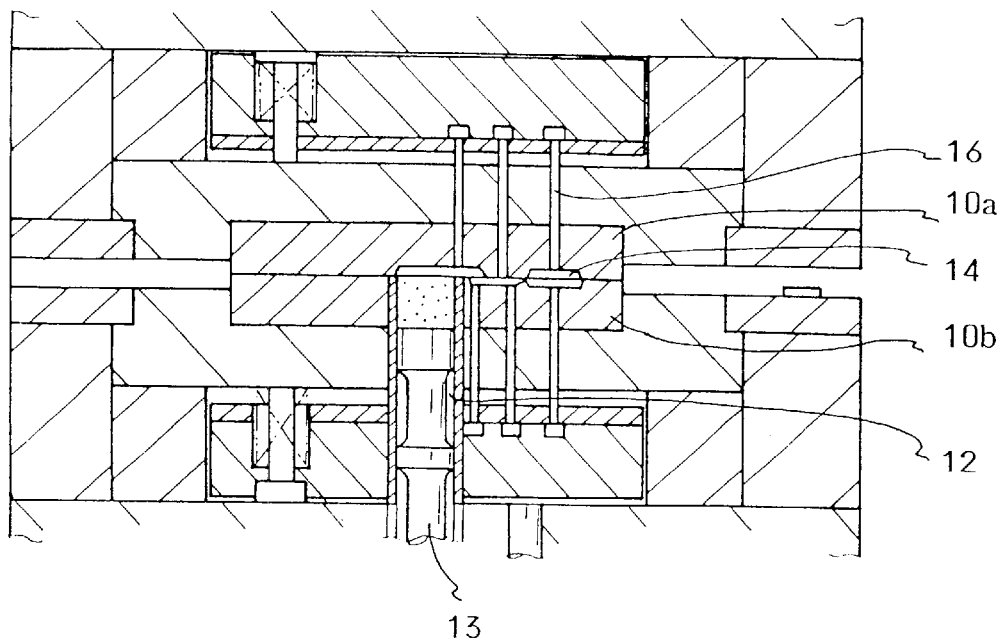
FIG. 16 is a sectional view of the conventional resin molding machine.

In the example shown in FIG. 14, the resin paths 180 are formed in the lower die 10b; in an example shown in FIG. 15, the resin paths 180 are formed in the upper die 10a. In the case of forming the resin paths 180 in the upper die 10a, the order of setting the lead frames 20 and setting the resin tablet 42 can be changed by providing the resin paths 180 in the upper die 10a or the lower die 10b. In some cases, molding efficiency can be raised by selecting said order. Further, since the release film 30 is provided on the lead frames 20, the resin can be prevented to directly contact the lead frames 20.

Note that, the resin tablets 42 in the first embodiment and the third embodiment are the stick typed resin tablets, but the columnar resin tablets, of course, can be used according to the shape of the pot in the second embodiment and the third embodiment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of molding a semiconductor with thermosetting resin comprising the steps of:

covering a parting face of a pair of molding dies including a cavity, a cull and a pot with a sheet of release film, said release film being easily peelable from said molding dies and thermosetting resin;

sucking said release film to hold said release film on said parting face;

further sucking said release film to stick the release film on and along an inner face of the cavity;

forming said release film with an accommodating section to correspond to an inner shape of the pot;

supplying a thermosetting resin tablet to the accommodating section in the pot; and clamping the semiconductor to be molded between said molding dies to mold.

2. The method of molding according to claim 1, further including the step of forming the accommodating section in said release film before the step of covering.

3. The method of molding according to claim 2, further comprising the steps of:

supplying the thermosetting resin tablet together with said release film; and preheating the thermosetting resin tablet in the accommodating section of the release film prior to said step of covering.

4. The method of molding according to claim 2, further comprising the step of covering a resin path, which passes over an opening section of the pot and said semiconductor to be molded, with additional release film.

5. The method of resin molding according to claim 4, wherein said additional release film is capable of covering over a clamped face of said member to be molded, and wherein the method includes the further step of providing said additional release film with a cavity hole, opened to correspond to opening sections of cavities of said molding dies.

6. A method of resin molding comprising the steps of:

fixing a sheet of release film capable of easily peeling off from the molding dies and resin on inner faces of molding sections including cavities, a cull and a pot, by means of an air sucking mechanism provided exteriorly of the molding dies and in communication with an air path formed between an inner face of the pot and an outer face of a plunger in the pot;

sucking said release film onto the inner faces of the molding sections;

providing a resin tablet onto said release film at a position corresponding to the pot;

setting the resin tablet in the pot by closing said molding dies;

supplying resin melt to the cavities of the molding dies from the pot;

attaching a seal ring on an outer circumferential face of the plunger on a base side thereof; and sealing the air path at a midway position of the plunger with the seal ring.

7. The method of resin molding according to claim 6, further comprising the step of:

providing sucking holes for sucking the release film to fix in the cavities.

8. The method of molding according to claim 1, further comprising the steps of:

molding a semiconductor;

opening the molding dies;

removing the molded semiconductor; and feeding a new section of release film to the parting face of the molding dies, wherein a new section of release film is fed to the parting face of the molding dies for each molding cycle.

9. The method of molding according to claims 2, wherein said step of supplying the thermosetting resin tablet to the accommodating section His performed before said step of covering.

10. The method of molding according to claim 1, further comprising the step of preventing adhesion of said release film to said molding dies.

11. The method of molding according to claim 2, further comprising the step of preventing adhesion of said release film to said molding dies.

* * * * *